UNITED STATES PATENT OFFICE.

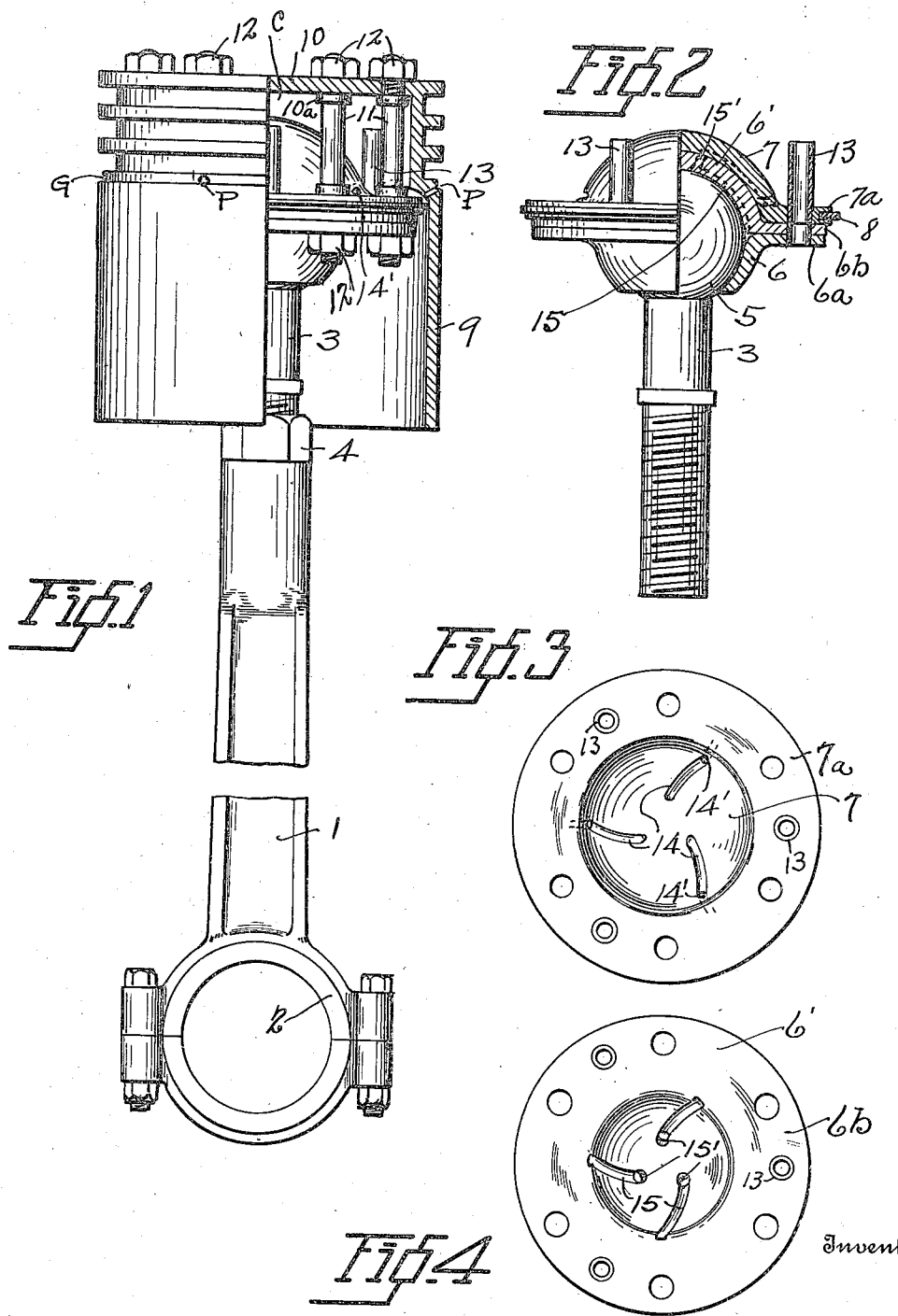

WILLIAM P. LOWTHER, OF SPOKANE, WASHINGTON.

PISTON.

1,298,234.　　　　Specification of Letters Patent.　　Patented Mar. 25, 1919.

Application filed January 31, 1918.　Serial No. 214,652.

*To all whom it may concern:*

Be it known that I, WILLIAM P. LOWTHER, a citizen of the United States, residing at Spokane, in the county of Spokane and State of Washington, have invented certain new and useful Improvements in Pistons, of which the following is a specification.

The present invention relates to improvements in pistons, and particularly to an improved form of lubricating bearing for pistons involving the use of a ball and socket joint in the connection between the piston and the connecting rod and crank shaft of an engine.

The primary object of the invention is the provision of a device of this character in which the ball and socket joint are properly lubricated without waste of lubricant, by the passage of oil from the walls of the cylinder through the body of the hollow piston of which the ball and socket joint forms a part. To this end the invention consists in certain novel combinations and arrangements of parts in combination with the ball and socket joint and the hollow piston as will be hereinafter more particularly referred to and claimed.

In the accompanying drawings one complete example of the physical embodiment of the invention is illustrated in which the device is constructed and arranged according to the best mode so far devised for the practical application of the principles of the invention.

In the drawings:—

Figure 1 is an elevation of a piston partly in cross section and showing in connection therewith a connecting rod.

Fig. 2 is a detail showing ball joint connection of the piston rod with the piston.

Fig. 3 is a plan view of the hemispherical casing for receiving the bars supporting the ball head of the piston rod.

Fig. 4 is a plan view of the bearing member fitting into Fig. 3 and contacting with the ball of the rod connection.

In the preferred form of the invention as illustrated in the drawings, a well known type of internal combustion engine piston is illustrated with its connecting rod as 1 and crank shaft bearing 2, the end of the rod being threaded to receive the extenison 3 which is secured to the rod by the lock nut 4 in usual manner. At the end of the extension is provided the spherical head or ball 5 which is loosely incased by the hemispherical bronze bearing plates 6 and 6' each of which is fashioned with an annular flange as 6ª and 6ᵇ, and the upper bearing plate 6' is provided with a hemispherical casing 7 preferably of aluminum and formed with an annular flange 7ª which is grooved to receive the packing ring 8 designed to frictionally engage the interior walls of the hollow piston 9 in order to retain the oil or lubricant in the upper end of the hollow piston, above the ball and socket joint. The bronze bearing plates form the socket for the ball, and the socket is rigidly fixed to the head 10 of the piston 9 through the instrumentality of a series of spaced studs 11 which are passed through the three flanges 6ª, 6ᵇ and 7ª of the socket, and through the head 10 of the piston, and formed with shoulders 10ª, so that the nuts 12 on the threaded ends of the studs may rigidly clamp the flanged socket to the piston head, as clearly shown.

In order that excess fluid or lubricant may escape from the chamber formed above the ball and socket joint a number of vent pipes 13, in the shape of open tubes fixed in and extending through the flanged part of the socket, are provided, and the upper, open end of these vent pipes is near the head of the piston. If an excess of oil accumulates in the chamber C, it may pass off through these vent pipes and down through the hollow piston back to the oil supply.

The joint between the ball and its bearing plates is lubricated with oil which is splashed or carried up the walls of the cylinder by the piston in its movements and to give ingress to the chamber C for this oil, ports P are provided, which extend through the wall of the hollow piston and open into the chamber C above the flange of the socket member of the joint. A sufficient number of these ports are provided and they are spaced about the piston at regular intervals in a groove G formed in the outer face of the piston for the purpose of accumulating oil to pass through these ports. The interior of the piston, or its chamber C is thus supplied with oil as a lubricant, and the oil passes through the casing 7 by way of the groove 14 in the concave face of the casing which receives oil through the passage 14', and then by way of the lubricating groove 15 in the concave face of the bearing plate 6' which receives the oil from the passage 15' that registers with the groove 14 in the casing. In this manner the lubricant passes through the socket and is spread upon the ball. There are three of these sets of grooves and passages illustrated, and it will be apparent that the joint is well and thoroughly lubricated, and friction reduced so that the hollow piston may freely revolve about the head or ball on the end of the connecting rod, thus preventing undue wear on any particular surface or point between the piston and its cylinder. The shoulders 10$^a$ on the studs 11 may be adjusted, if desired, to adjust the piston for clearance in the cylinder, in addition to connecting the connecting rod with the piston head for support.

By the utilization of this style of joint and its connections, a compact, simple and rigid connection is attained between the piston and the socket member of the joint, the joint is freely lubricated, and the piston is free to revolve horizontally about the ball, thus eliminating irregular wear on the piston and the cylinder.

Claims:

1. The combination with a hollow piston of a connecting rod having a ball and socket joint therebetween comprising a pair of hemispherical flanged bearing plates, and a hemispherical casing over the upper plate, together, forming an oil chamber in the upper end of the piston, a packing ring carried by the casing, and a ball on the end of the connecting rod located in the socket.

2. The combination with a hollow piston, a connecting rod and a ball on its end, of a socket for the ball comprising bearing plates incasing the ball and formed with rigidly connected annular flanges, and a packing ring carried by the socket to provide an oil chamber in the upper end of the piston, there being openings in the wall of the piston for passage of oil and openings in the socket for passage of oil to the surface of the ball.

3. The combination with a hollow piston, a connecting rod and a ball on its end, of a socket for the ball comprising flanged bearing plates and a flanged casing for the upper plate, a packing ring carried by the casing, supporting studs connecting the flanges with the piston head, vent pipes passing through said flanges, there being openings through the wall of the piston and through the casing and one of the plates for passage of oil, as described.

In testimony whereof I affix my signature.

WILLIAM P. LOWTHER.